US010137357B1

(12) United States Patent
Rosolowski et al.

(10) Patent No.: US 10,137,357 B1
(45) Date of Patent: Nov. 27, 2018

(54) SKATEBOARD DECKS AND METHODS FOR CONSTRUCTING SKATEBOARD DECKS

(71) Applicants: Mark Anthony Rosolowski, Huntington Beach, CA (US); Gregory David Rosolowski, Huntington Beach, CA (US)

(72) Inventors: Mark Anthony Rosolowski, Huntington Beach, CA (US); Gregory David Rosolowski, Huntington Beach, CA (US)

(73) Assignee: LITHE INDUSTRIES, LLC, Huntington Beach, CA (US)

( * ) Notice: Subject to any disclaimer, the term of this patent is extended or adjusted under 35 U.S.C. 154(b) by 0 days.

(21) Appl. No.: 15/887,067

(22) Filed: Feb. 2, 2018

(51) Int. Cl.
| | | |
|---|---|---|
| *A63C 17/01* | (2006.01) | |
| *B32B 21/08* | (2006.01) | |
| *B32B 27/20* | (2006.01) | |
| *B32B 27/38* | (2006.01) | |
| *B32B 3/08* | (2006.01) | |
| *B32B 21/04* | (2006.01) | |
| *B29L 31/52* | (2006.01) | |
| *B29C 70/34* | (2006.01) | |
| *B29C 70/54* | (2006.01) | |
| *B29K 63/00* | (2006.01) | |
| *B29K 307/04* | (2006.01) | |
| *B29K 309/08* | (2006.01) | |
| *B29K 711/14* | (2006.01) | |

(52) U.S. Cl.
CPC .............. *A63C 17/017* (2013.01); *B32B 3/08* (2013.01); *B32B 21/042* (2013.01); *B32B 21/08* (2013.01); *B32B 27/20* (2013.01); *B32B 27/38* (2013.01); *B29C 70/34* (2013.01); *B29C 70/545* (2013.01); *B29K 2063/00* (2013.01); *B29K 2307/04* (2013.01); *B29K 2309/08* (2013.01); *B29K 2711/14* (2013.01); *B29L 2031/52* (2013.01); *B32B 2262/101* (2013.01); *B32B 2262/106* (2013.01)

(58) Field of Classification Search
CPC ....... A63C 17/017; B32B 3/08; B32B 21/042; B32B 21/08; B32B 27/20; B32B 27/38
See application file for complete search history.

(56) References Cited

U.S. PATENT DOCUMENTS

| | | | | |
|---|---|---|---|---|
| 5,649,717 | A | * | 7/1997 | Augustine ................ A63C 5/03 280/610 |
| 6,182,986 | B1 | * | 2/2001 | Smith .................... A63C 17/01 280/610 |
| 6,565,104 | B1 | | 5/2003 | Colon |

(Continued)

*Primary Examiner* — Erez Gurari
(74) *Attorney, Agent, or Firm* — Hankin Patent Law, APC; Kevin Schraven; Anooj Patel

(57) ABSTRACT

A skateboard deck that has a reduced weight, improved strength, and is, overall, more resilient. The addition of composite laminate layers improves the strength and performance of the skateboard. A composite layer may include carbon fiber layers, which are used to reduce the weight and thickness of the skateboard, while increasing the resilience and strength. Layered, high-strength tipfills and layered side edges may prevent chipping and delamination. The composite layers may inlay into the tipfills and side edges, allowing for protection of the composite layers. The tipfills and side edges protect the various other layers and prevent normal wear from abrasion, chipping, and delamination of the deck.

20 Claims, 12 Drawing Sheets

(56) References Cited

U.S. PATENT DOCUMENTS

| | | | |
|---|---|---|---|
| 6,854,748 B2 | 2/2005 | Wimbish et al. | |
| 7,138,027 B1 * | 11/2006 | Canizales | B29C 43/203 |
| | | | 156/245 |
| 7,628,412 B2 * | 12/2009 | Colon | A63C 17/01 |
| | | | 280/809 |
| 7,748,725 B2 | 7/2010 | Piumarta | |
| 7,810,824 B2 * | 10/2010 | Woodall | A63C 17/01 |
| | | | 280/87.041 |
| 8,002,296 B2 | 8/2011 | Meader | |
| 8,807,582 B1 | 8/2014 | Piumarta | |
| 2003/0104165 A1 * | 6/2003 | Guex | A63C 5/03 |
| | | | 428/113 |
| 2004/0135347 A1 * | 7/2004 | Marion | A63C 5/03 |
| | | | 280/610 |
| 2005/0077704 A1 * | 4/2005 | Guex | A63C 5/03 |
| | | | 280/610 |
| 2008/0296858 A1 * | 12/2008 | Burwell | A63C 17/01 |
| | | | 280/87.042 |
| 2008/0305330 A1 * | 12/2008 | Rancon | A63C 5/12 |
| | | | 428/373 |
| 2009/0121447 A1 * | 5/2009 | Piumarta | A63C 17/01 |
| | | | 280/87.042 |
| 2011/0045266 A1 * | 2/2011 | Gangemi | A63C 17/017 |
| | | | 428/220 |
| 2012/0263916 A1 * | 10/2012 | Green | A63C 17/017 |
| | | | 428/138 |
| 2014/0110914 A1 * | 4/2014 | Barrett | A63C 17/01 |
| | | | 280/87.042 |
| 2015/0021874 A1 | 1/2015 | Imbrie et al. | |
| 2017/0003678 A1 * | 1/2017 | Colon | A63C 17/017 |
| 2017/0113120 A1 * | 4/2017 | Hill | A63C 5/126 |
| 2017/0259160 A1 * | 9/2017 | Docter | A63C 5/006 |

* cited by examiner

SKATEBOARD DECKS AND METHODS FOR CONSTRUCTING SKATEBOARD DECKS

FIELD OF USE

The present disclosure relates generally to skateboard decks and methods of constructing skateboards. More specifically, the present disclosure relates to methods of constructing skateboard decks comprising composite layers, protective tipfills, and protective side edges to improve strength, durability, and performance.

BACKGROUND

Standard skateboard decks are made from a varied number of layers or plies of wood that are adhesively pressed together and then sealed with a material coating. The coating allows for a more durable and longer-lasting skateboard. One issue with standard skateboards is that they wear, chip, break, and lose performance very easily, especially when being worked hard by an experienced user. High-end skateboards may include thick protective tips, made from plastic or other durable materials, but the sides are still exposed and the protective tips do not protect all the layers within the skateboard. Some have plastic on the outer layers, but no protection on the inner layers. There are skateboards with protection on the inner layers, but no protection on the outer layers. Some skateboards have the composite layer continue completely to the edge, allowing it to get damaged and potentially cause irritating and/or dangerous composite splinters.

Thus, what is needed is a method for constructing a more durable, higher-performing skateboard deck with one or more precut composite layers that inlay into protective tipfills and side edges.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to methods for constructing a composite-layered skateboard deck that, when compared to standard skateboards, has a reduced weight, improved strength, and is, overall, more resilient and durable. The addition of composite laminate layers improves the strength and performance of the skateboard. A composite layer may include carbon fiber layers, which are used to reduce the weight and thickness of the skateboard, while, at the same time, increasing the resilience, strength, and durability of the skateboard deck. High-strength tipfills and protective side edges may be added to the skateboard to prevent chipping and delamination. The composite layers may inlay into the tipfills and side edges, allowing for protection of the composite layers. The tipfills and side edges may also protect the various other layers, usually wood, and prevent excessive wear from abrasion, chipping, and delamination of each layer.

One embodiment may be a skateboard deck, comprising: a first composite layer; at least two wood layers; and a second composite layer; wherein said first composite layer comprises at least one first composite sheet and at least two first tipfills; wherein said second composite layer comprises at least one second composite sheet and at least two second tipfills; wherein said at least two wood layers each comprise at least one wood sheet and at least two third tipfills; wherein an epoxy is applied to said first composite layer, said at least two wood layers, and second composite layer; wherein said at least two wood layers are stacked between said first composite layer and said second composite layer; wherein said first composite layer, said at least two wood layers, and second composite layer are pressed together in a mold and said epoxy cures to create an uncut skateboard deck; wherein said uncut skateboard deck is cut and smoothed; wherein said at least two first tipfills, said at least two second tipfills, and said at least two third tipfills may be made of plastic; wherein at least one of said first composite layer, said at least two wood layers, and second composite layer, may comprise at least two protective side edges; wherein said at least two protective side edges may be materials selected from the group of materials consisting of at least one of: wood, plastic, and combinations thereof; wherein said first composite layer, at least one of said at least two wood layers, and said second composite layer, may each comprise at least two protective side edges; wherein said first composite layer, said at least two wood layers, and said second composite layer, may each comprise at least two protective side edges; wherein said first composite sheet and said second composite sheet may be materials selected from the group of materials consisting of at least one of: fiberglass; carbon fiber, aramid fibers, and combinations thereof. The skateboard deck may further comprise a third composite layer; wherein said third composite layer consists of a third composite sheet that is saturated with epoxy and layered outside of said first composite layer or said second composite layer; wherein said third composite sheet may be a material selected from the group of materials consisting of at least one of: fiberglass; carbon fiber, aramid fibers, and combinations thereof.

Another embodiment of a skateboard deck may comprise: a precure top layer, a precure bottom layer, at least two inner-core layers, and at least two outer-core layers; wherein each of said at least two inner-core layers comprise: an inner-core ply; at least two inner-core tipfills, and at least two inner-core side edges; wherein said at least two inner-core tipfills matingly inlay with said inner-core ply at opposite ends of said inner-core ply; wherein at least two inner-core side edges matingly inlay with said inner-core ply on opposite sides of said inner-core ply; wherein each of said at least two outer-core layers comprise: an outer-core ply, at least two outer-core side edges, and at least four outer-core tipfills; wherein a first set of two of said at least four outer-core tipfills matingly inlay with said outer-core ply at opposite ends of said outer-core ply; wherein a second set of two of said at least four outer-core tipfills are stacked above said first set of two of said at least four outer-core tipfills at said opposite ends of said outer-core ply; wherein said at least two outer-core side edges are stacked above two opposite side edges of said outer-core ply and run between said second set of two of said at least four outer-core tipfills; wherein said precure top layer comprises at least one top layer composite sheet that is saturated in an epoxy, cured, and cut, such that said precure top layer is configured to matingly inlay within said at least two outer-core side edges and said second set of two of said at least four outer-core tipfills; wherein said precure bottom layer comprises at least one bottom layer composite sheet that is saturated in said epoxy, cured, and cut, such that said precure bottom layer is configured to matingly inlay within said at least two outer-core side edges and said second set of two of said at least four outer-core tipfills; wherein resin is applied to all layers and said precure top layer is stacked above a first of said at least two outer-core layers, which is stacked above said at least two inner-core layers, which are stacked above a second of said at least two outer-core layers, which is stacked above said precure bottom layer, to form a stack of resin coated layers; wherein said resin coated layers are pressed together and cured, such that an uncut skateboard deck is created; and wherein said uncut skateboard deck is cut and smoothed; wherein the precure top layer may further comprise a fiberglass sheet and a carbon fiber sheet; wherein the precure bottom layer may further comprise a fiberglass sheet. The skateboard deck may further comprise two truck supports and at least two carbon stringers; wherein said first set of two of said at least four outer-core tipfills may be shaped differently than said second set of said at least four outer-core tipfills; wherein at least one of said at least two inner-core layers may not comprise two or more inner-core side edges; wherein said inner-core ply of said at least two inner-core layers may be wood; and the said outer-core ply of said at least two outer-core layers may be wood; wherein said at least two inner-core tipfills and said at least four outer-core tipfills may be plastic; wherein said at least two inner-core side edges and said at least four outer-core side edges may be plastic.

Another embodiment of a skateboard deck may comprise: a precure top layer, a precure bottom layer, at least two inner-core layers, and two outer-core layers; wherein each of said at least two inner-core layers comprise: an inner-core ply; at least two inner-core tipfills, and at least two inner-core side edges; wherein said at least two inner-core tipfills matingly inlay with said inner-core ply at opposite ends of said inner-core ply; wherein at least two inner-core side edges matingly inlay with said inner-core ply on opposite sides of said inner-core ply; wherein each of said two outer-core layers comprise: an outer-core ply, at least two outer-core side edges, and at least four outer-core tipfills; wherein a first set of two of said at least four outer-core tipfills matingly inlay with said outer-core ply at opposite ends of said outer-core ply; wherein a second set of two of said at least four outer-core tipfills are stacked above said first set of two of said at least four outer-core tipfills at said opposite ends of said outer-core ply; wherein said at least two outer-core side edges are stacked above two opposite side edges of said outer-core ply and run between said second set of two of said at least four outer-core tipfills; wherein said precure top layer comprises a fiberglass sheet and a carbon fiber sheet are saturated in an epoxy, cured, and cut, such that said precure top layer is configured to matingly inlay within said at least two outer-core side edges and said second set of two of said at least four outer-core tipfills; wherein said precure bottom layer comprises a fiberglass sheet that is saturated in said epoxy, cured, and cut, such that said precure bottom layer is configured to matingly inlay within said at least two outer-core side edges and said second set of two of said at least four outer-core tipfills; wherein resin is applied to all layers and said precure top layer is stacked above a first of said at least two outer-core layers, which is stacked above said at least two inner-core layers, which are stacked above a second of said at least two outer-core layers, which is stacked above said precure bottom layer, to form a stack of resin coated layers; wherein said resin coated layers are pressed together and cured, such that an uncut skateboard deck is created; wherein said uncut skateboard deck is cut and smoothed; wherein said at least two inner-core tipfills and said at least four outer-core tipfills are plastic; wherein said inner-core ply of said at least two inner-core layers is wood; and wherein said outer-core ply of said two outer-core layers is wood; wherein at least one of said at least two inner-core layers may not comprise two or more inner-core side edges.

In one embodiment, the skateboard is comprised of at least six layers. The first layer may be a protective layer (or coating) that covers the inside composite layers. The second layer is a composite layer that is precut to a shape similar to the final cutout (silhouette) of the completed skateboard, but may be inset to be smaller than the final cutout. The second layer may also comprise, using materials which have a similar thickness to the composite, tipfills, which are used to fill in the tip ends of the inset, and side edges, which are used to fill in the sides of the inset, effectively creating an inlay. The third layer may typically be below the second layer. The third layer may comprise a ring layer in the shape of a ring, which may be comprised of a single piece or comprised of one or more tipfills and one or more side edges. The fourth layer is comprised of a wood (or other suitable material) layer that has a cutout shape at the ends that is similar to the second layer. The cutout shape of the fourth layer allows tipfills to be inserted or dovetailed at the ends of it, but, again, preferably using a smaller inset to prevent breaking points. This fourth layer may or may not have side edges as well, which would also be inset to prevent breaking points. There can be several of the third and fourth layers stacked to vary the thickness of the skateboard deck, each layer having a different inset to prevent breaking points. The fifth layer may be below the fourth layer and may comprise another composite layer that is assembled in the same manner as the second layer. The sixth layer may be a coating or protective layer that may be below the fifth layer, and is used primarily to protect the bottom of the fifth layer. All six layers are assembled with glue and pressed against a mold to form the flat or concave shape, as desired. After pressing, a perimeter cut based on a desired mold or silhouette is done to give the skateboard its final shape.

In one embodiment, the composite-layered skateboard may have only tipfills and no protective side edges. In other embodiments, the composite-layered skateboard may have only protective side edges and no tipfills. The protective side edges and or tipfills are layered with the primary layers of the skateboard deck.

In one embodiment, the tipfills may be made of plastic. In other embodiments, the tipfills may be made of other durable materials, such as carbon fiber, Kevlar® (aramid fibers), ceramics, fiberglass, and the like. In one embodiment, the side edges may be made of plastic. In other embodiments, the side edges may be made of other durable materials, such as carbon fiber, wood, Kevlar® (aramid fibers), ceramics, fiberglass, and the like.

Other embodiments may have multi-layer tipfills and/or side edges. One embodiment comprises a seven-layer construction. Another embodiment may comprise a five-layer construction or a three-layer construction. Other embodiments may have stacked tipfills and/or side edges that alternate in length or differ in length (which requires that the wood or composite part of that layer to also vary or differ in length). Some embodiments may have stacked tipfills and/or side edges that increase in length, decrease in length, or a variation and/or alternation of increasing and then decreasing in length.

In other embodiments, the layers comprising the ply, the tipfills, and/or side edges may be assembled as one part. In other embodiments, the layers comprising the ply, the tipfills, and/or side edges may be assembled as multiple parts. In another embodiment, the width of the arch of the tipfills may vary throughout the arch.

In one embodiment, the ring layer may comprise a single, unitary part. In other embodiments, the ring layer may be comprised of, two, three, four, or more than four, tipfills and side edges. In other embodiments, the ring layer may be made of plastic. In other embodiments, the ring layer may be made of other durable materials, such as carbon fiber, wood, Kevlar® (aramid fibers), ceramics, fiberglass, and the like.

In another embodiment, any of the layers, including the precure top, precure bottom, ring layer, outer-core, and inner-core, may be made of veneer, Maplewood, *Paulownia* wood, other types of wood, carbon fiber, or any other suitable and durable material. In other embodiments, layers may be made of material that is different than what is used in the other layers, or the grain direction may differ. For example, two or more types of woods may be used and/or two or more different composite materials may be used.

In other embodiments, the methods disclosed for a composite-layered skateboard may also be applied to constructing other types of decks, such as for snow-boarding, wake boarding, and skiing.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF THE ILLUSTRATIVE EMBODIMENTS

Figure 1:
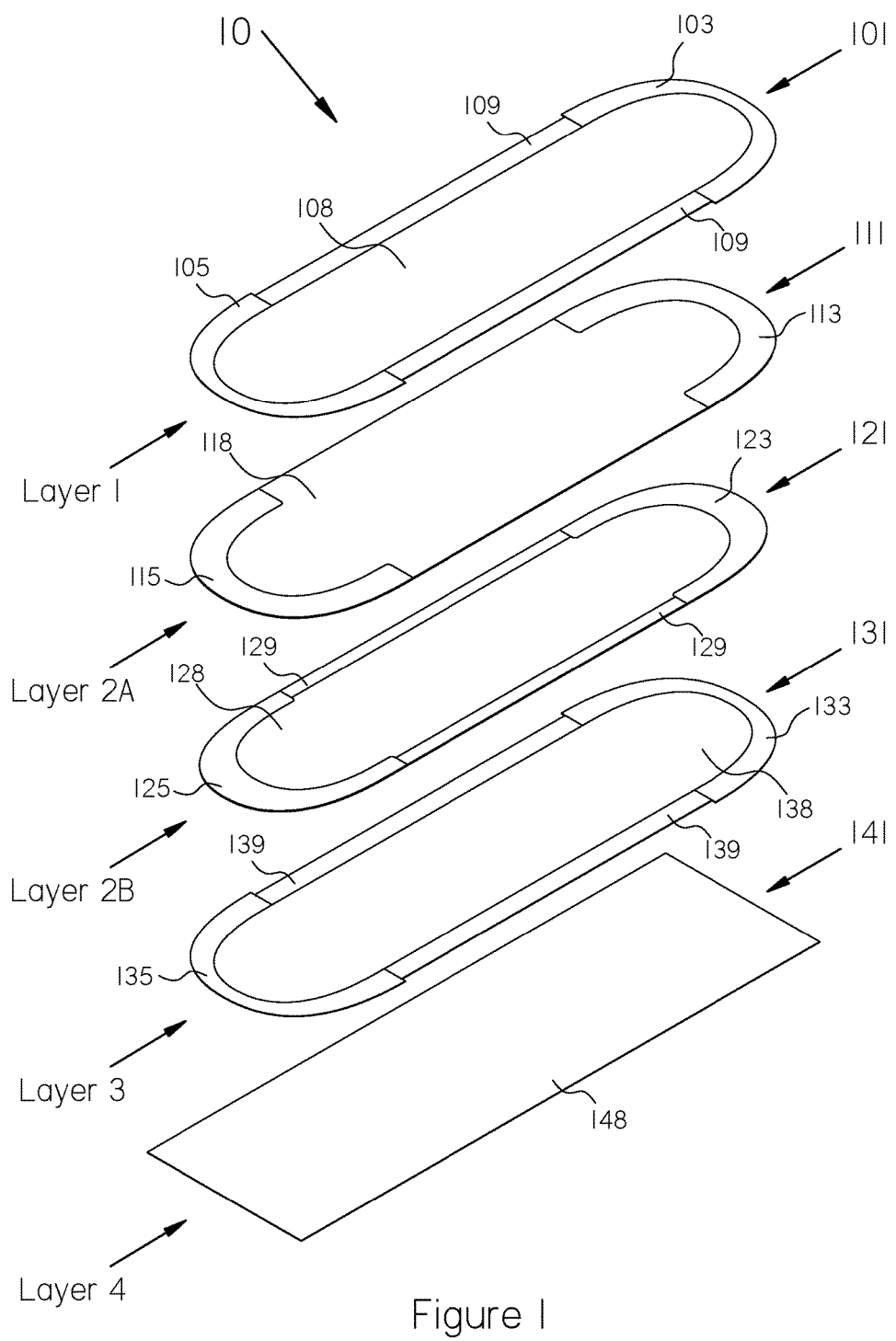
FIG. 1 is an illustration of one embodiment of one method for constructing a skateboard deck.

In the following detailed description of various embodiments, numerous specific details are set forth in order to provide a thorough understanding of various aspects of the embodiments. However, the embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.0001-10% from the indicated number or range of numbers.

In accordance with the embodiments disclosed herein, the present disclosure is directed to methods for constructing a composite-layered skateboard deck that, when compared to standard skateboards, has a reduced weight, improved strength, and is, overall, more resilient. The addition of composite laminate layers improves the strength and performance of the skateboard. A composite layer may include carbon fiber layers, which are used to reduce the weight and thickness of the skateboard, while increasing the resilience and strength. High-strength tipfills and side edges are added to the skateboard to prevent chipping and delamination. The composite layers may inlay into the tipfills and side edges (also referred to as sidewalls), allowing for protection of the composite layers. The tipfills and side edges protect the various other layers and prevent normal wear from abrasion, chipping, and delamination of layer.

The term "tipfill" and "tipfills", as used herein, refers to an edge or end inlay of a material that is different than the material that it is inlayed against. The inlay or tipfill may have the same or substantially the same thickness as the layer with which it is matingly dovetailed.

The term "composite", as used herein, refers to a material, such as, but not limited to fiberglass, carbon fiber, carbon fibre, aramid fibers, and the like, that is combined with a resin. The composite may include more than one type of material, such as including both fiberglass and carbon fiber.

FIG. 1 is an illustration of one embodiment of one method for constructing a skateboard deck. FIG. 1 shows that skateboard deck 10 may comprise four layers, Layer 1, Layer 2A, Layer 2B, Layer 3, and Layer 4. The first layer 101 may comprise a composite sheet 108, sometimes referred to as a ply or layer, that is precut to a shape similar to the final cutout of the completed skateboard, but inset to be smaller than the final cutout. Using material that has a similar thickness as the composite sheet 108, tipfills 103, 105 are placed at the ends of the composite sheet 108. As shown, the tipfills 103, 105 are cut to inlay or dovetail with the composite sheet 108 so that they matingly form a single Layer 1. Side edges 109, which may be made from protective plastic, wood, or other suitable material, may be placed at the sides of the composite sheet 108, effectively creating an inlay on the sides, which protects the composite sheet/layer from wear damage.

FIG. 1 shows how each layer may have a protective plastic tipfill 103, 105, 113, 115, 123, 125, 133, 135. This ensures that all layers are protected by the tipfill and the layered tipfills 103, 105, 113, 115, 123, 125, 133, 135 are stronger than a block tipfill made from injection molding.

The second layer is one or more layers 111, 121, which are below the first layer 101, and may comprise a wood sheet 118, 128 that may have cutout shapes at the ends that are similar to, but preferably not identical to, the composite first layer 101. The ends of each of the wood sheets 118, 128, may have tipfills 113, 115, 123, 125, which are inserted at the ends of the wood sheets 118, 128 to form second layer 111, 121, but, as shown, may have a smaller inset to prevent breaking points. The tipfills 113, 115, 123, 125 preferably matingly inlay with the wood sheets 118, 128 of layers 111, 121.

FIG. 1 also shows that Layer 2A may have a veneer edge without a side protective layer inlay. Layer 2B shows that one or more of the second layers 121 may comprise protective side edges 129 made of differing material, which are also inset to prevent breaking points. Protective side edges 129 are preferably plastic, but may be wood. Although Layer 2A is shown without a protective side edge, it may also have a side edge. The layer 111 not having side protective edges may provide additional strength to the skateboard deck because it reduces the chances of a break point forming by having too many edges stacked up on top of each other. The second layer may be as few as one layer or as many as 40 layers of wood, depending on the thickness of the layers and the desired attributes of the skateboard deck. One embodiment may have three to nine second layers of wood.

Preferably, the layers 101, 111, 121, 131 have main layers that are different, even if just slightly, in shape, so that the inlays (tipfills and protective side edges) do not identically overlap, which might cause a break point.

The third layer 131 may comprise a bottom composite layer that is assembled in a method similar to the first layer 101. The third layer 131 is placed below the second layer 111 and any subsequent additional second layers 121. The third layer may comprise composite sheet 138, tipfills 133, 135, and protective side edges 139. The protective side edges 139 may be plastic or wood.

The fourth layer 141 is below the third layer 131 and may be made of composite material 148. The fourth layer 141 may also be made of wood or other suitable material, such as a very thin wood veneer, or a thick plastic film. The Layer 4 141 may serve the purpose of protecting the layers above it. There may also be a protective layer on the top of the first layer 101 as well.

Figure 2:
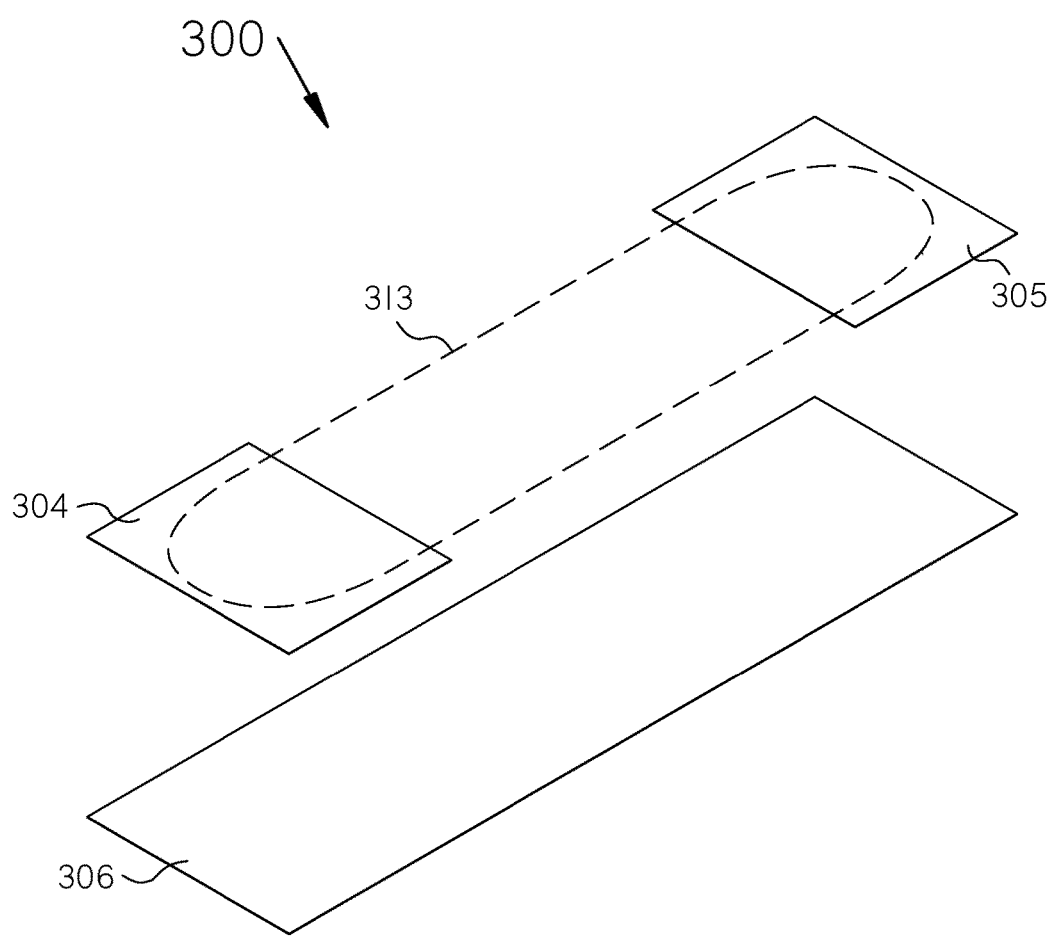
FIG. 2 is an illustration of a perspective view of one embodiment of a method to create a precure bottom of a skateboard deck.

FIG. 2 is an illustration of a perspective view of one embodiment of a method to create a precure bottom of a skateboard deck. FIG. 2 shows that the precure bottom 300 may comprise two gummy ends layer 304, 305, and a fiberglass layer 306. The fiberglass layer 306 may also be made of other composite fabrics, such as carbon fiber or basalt glass. The fiberglass layer 306 is a composite layer, the fiberglass may preferably be saturated with epoxy, resin, and/or glue. The gummy end layers 304, 305 may preferably be large enough so that they overlap the ends of the cutout path 313. Gummy is rubber foil, sometimes referred to as VDS, which stands for vibration dampening system. Gummy may be a thin sheet of rubber that aids with bonding and impact, especially with respect to two materials that have very different durometers, such as fiberglass and plastic or fiberglass and wood. The method for constructing the precure bottom 300 may comprise layering the gummy end layers 304, 305 on top of the fiberglass layer 306 and fully saturating the fiberglass layer 306 with epoxy. After the epoxy saturation and curing, the precure bottom 300 is pressed and cutout. Afterwards, light sanding and cleaning with alcohol may be done on all surfaces of the precure bottom 300.

Figure 3:
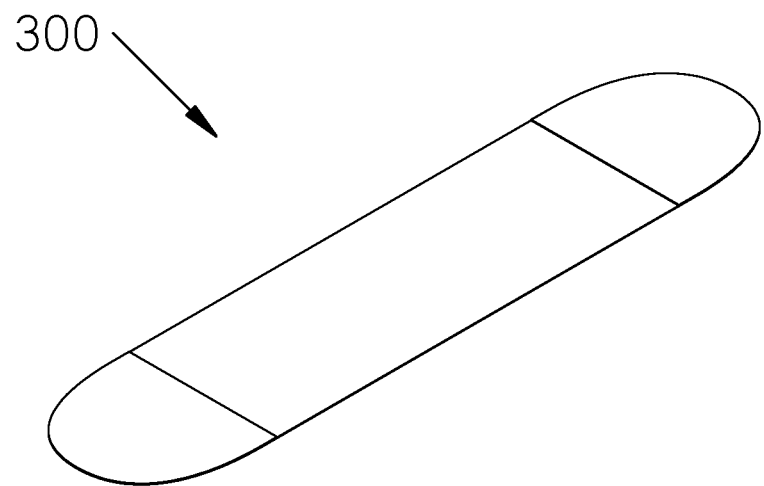
FIG. 3 is an illustration of a perspective view of one embodiment of a precure bottom of a skateboard deck.

FIG. 3 is an illustration of a perspective view of one embodiment of a precure bottom of a skateboard deck. FIG. 3 shows the final precure bottom 300 after it is cured, cut, and sanded. The precure bottom 300 is an example of a composite layer that uses fiberglass. The precure bottom 300 may be an outer-core layer.

Figure 4:
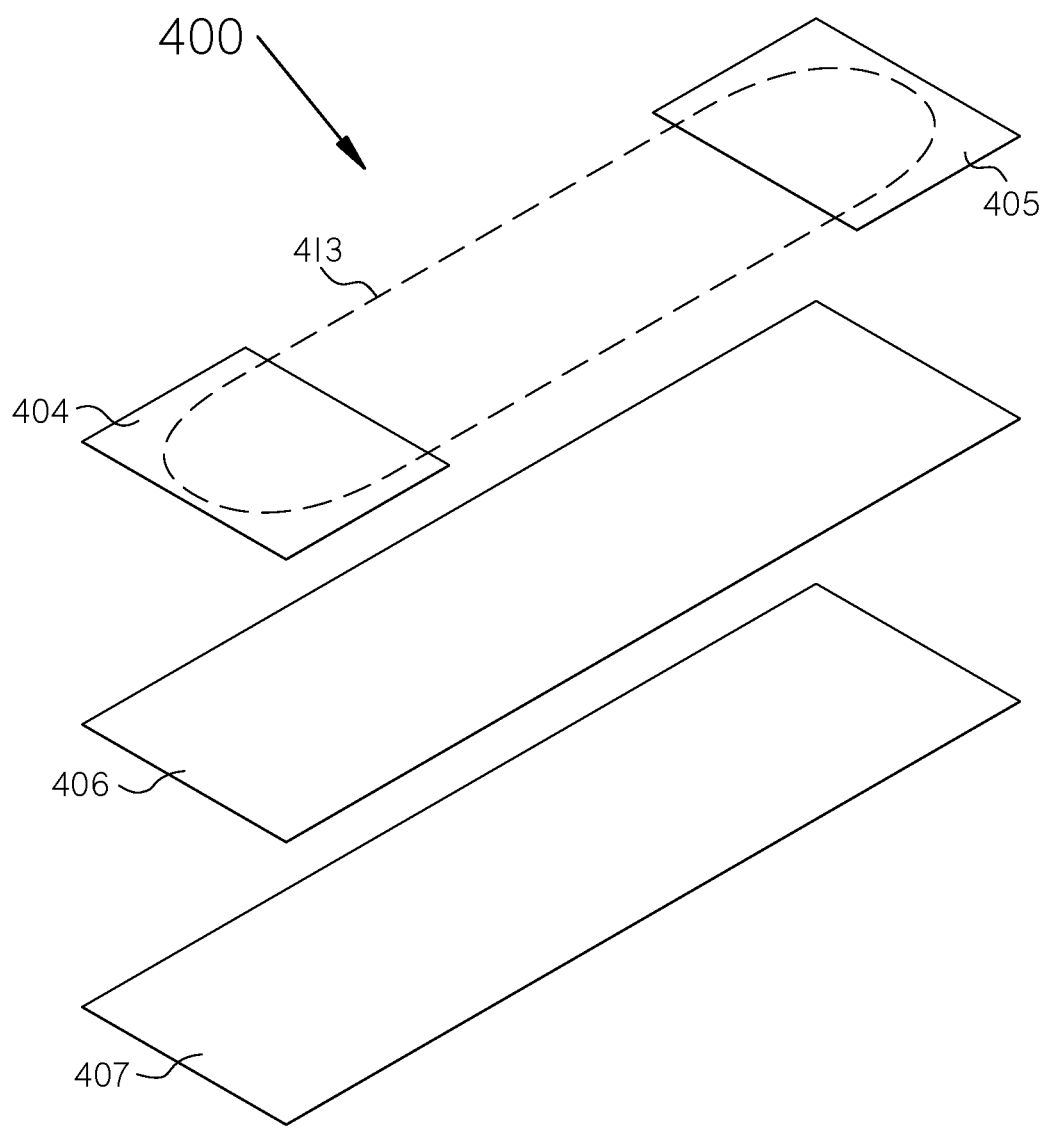
FIG. 4 is an illustration of a perspective view of one embodiment of a method to create a precure top of a skateboard deck.

FIG. 4 is an illustration of a perspective view of one embodiment of a method to create a precure top of a skateboard deck. FIG. 4 shows that the precure top 400 may comprise two gummy end layers 404, 405, a fiberglass layer 406, and a carbon fiber layer 407. The fiberglass layer 406 may also be made of other composite fabrics, such as carbon fiber or basalt glass. The carbon fiber layer 407 may also be made of any other durable material, such as wood. All layers may be saturated with epoxy. The gummy end layers 404, 405 may preferably be large enough so that it overlaps the ends of the cutout path 413. The method for constructing the precure top 400 may comprise layering the gummy end layers 404, 405, the fiberglass layer 406, and a carbon fiber layer 407, and fully saturating the fiberglass layer 406 and carbon fiber layer 407 with epoxy. After the epoxy saturation and curing, the precure top 400 is pressed and cutout. Afterwards, light sanding and cleaning with alcohol may be done on all surfaces of the precure top 400. The positioning of the carbon fiber layer and the fiberglass layer can be swapped.

Figure 5:
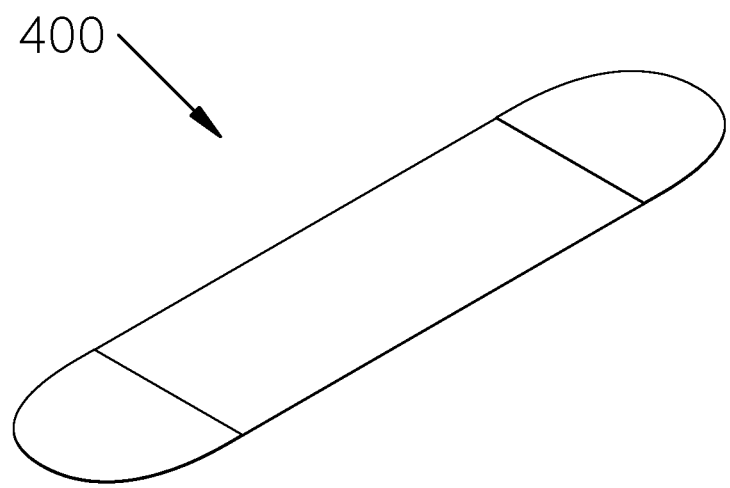
FIG. 5 is an illustration of a perspective view of one embodiment of a precure top of a skateboard deck.

FIG. 5 is an illustration of a perspective view of one embodiment of a precure top of a skateboard deck. FIG. 5 shows the final precure top 400 after it is cured, cut, and sanded. The precure top 400 is an example of a composite layer that uses fiberglass and carbon fiber. The precure top 400 may be an outer-core layer.

Figure 6:
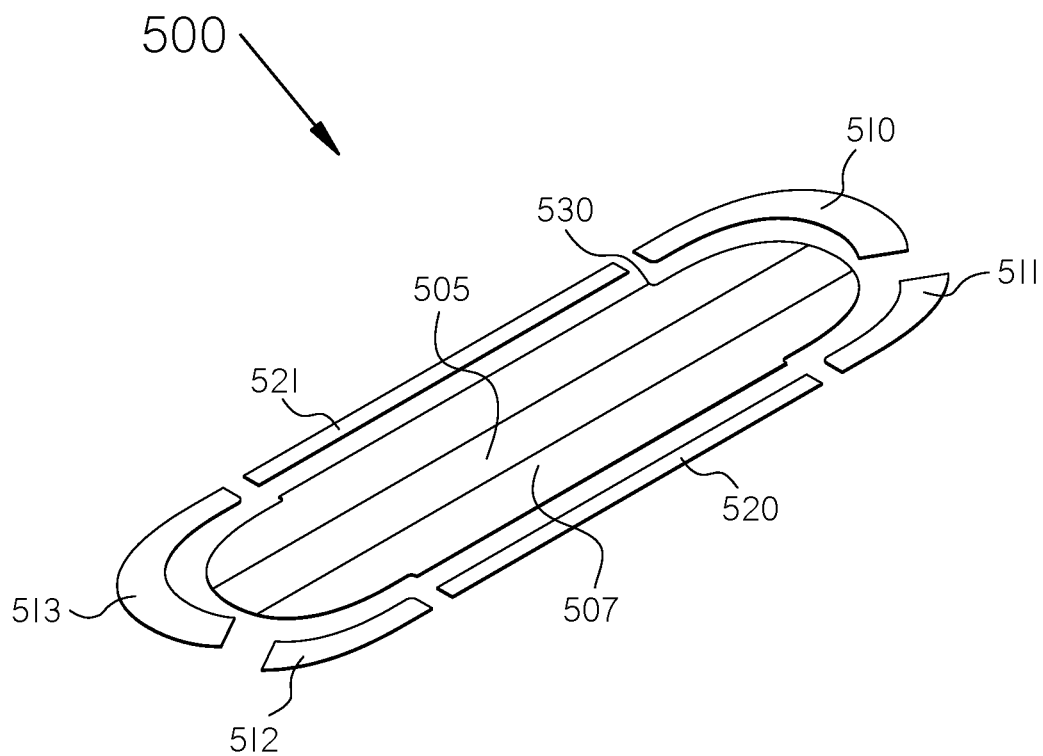
FIG. 6 is an illustration of an exploded view of one embodiment of an inner-core layer of a skateboard deck.

FIG. 6 is an illustration of an exploded view of one embodiment of an inner-core layer of a skateboard deck. As shown, the inner-core 500 may comprise an inner-core ply 505, one or more inner-core side edges 520, 521, and one or more inner-core tipfills 510, 511, 512, 513. The inner-core ply 505 may be made of veneer, a thin sheet, ply, or layer of wood. FIG. 6 shows that the inner-core ply 505 may be made from three cut planks 507, but it may be one solid plank of wood. The inner-core side edges 520, 521 may be placed along the two sides, which may protrude outward 530 so as to prevent break points, and sit flush against the protruding edge 530 of the inner-core ply 505. The inner-core tipfills 510, 511, 512, 513 may be placed on the two ends of the inner-core ply 505. The inner-core tipfills 510, 511, 512, 513 may be one single piece at each end, or, as shown, may be split into at least two parts. Preferably, the seam between two adjacent tipfills is not in the center of the split. Each end of the inner-core side edges 520, 521 may sit flush against an end of the inner-core tipfills 510, 511, 512, 513, but, preferably, the diameter of the two protective portions are different so as to prevent break points.

The inner-core tipfills 510, 511, 512, 513 and inner-core side edges 520, 521 may be plastic or other durable material that provide a protective edge and end to the skateboard deck. The inner-core tipfills 510, 511, 512, 513 and inner-core side edges 520, 521 may be created as a thin sheet that is preferably the same or substantially the same thickness as the inner-core ply 505. The specific shapes of the inner-core tipfills 510, 511, 512, 513 and inner-core side edges 520, 521 may then be cut and placed next to the inner-core ply 505. In one embodiment, either the tipfills 510, 511, 512, 513 or inner-core side edges 520, 521, may be wood.

Figure 7:
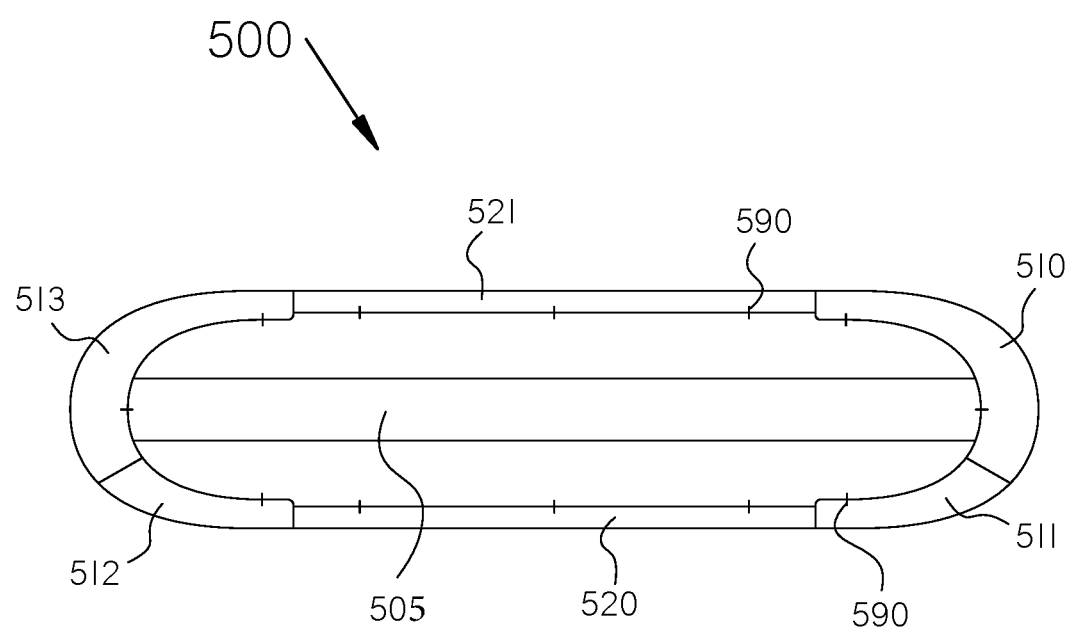
FIG. 7 is an illustration of a top view of one embodiment of an inner-core layer of a skateboard deck.

FIG. 7 is an illustration of a top view of one embodiment of an inner-core layer of a skateboard deck. FIG. 7 shows that the inner core 500 may be made up of an inner-core ply 505, inner-core tipfills 510, 511, 512, 513, and inner-core side edges 520, 521. These parts, until epoxied together, may be held in place during construction with staples 590. Other unobtrusive fasteners similar to staples may be used. The staples are preferably hammered into the inner-core 500, such that they are flush with the outer surface of inner-core 500 and do not noticeably protrude.

Figure 8:
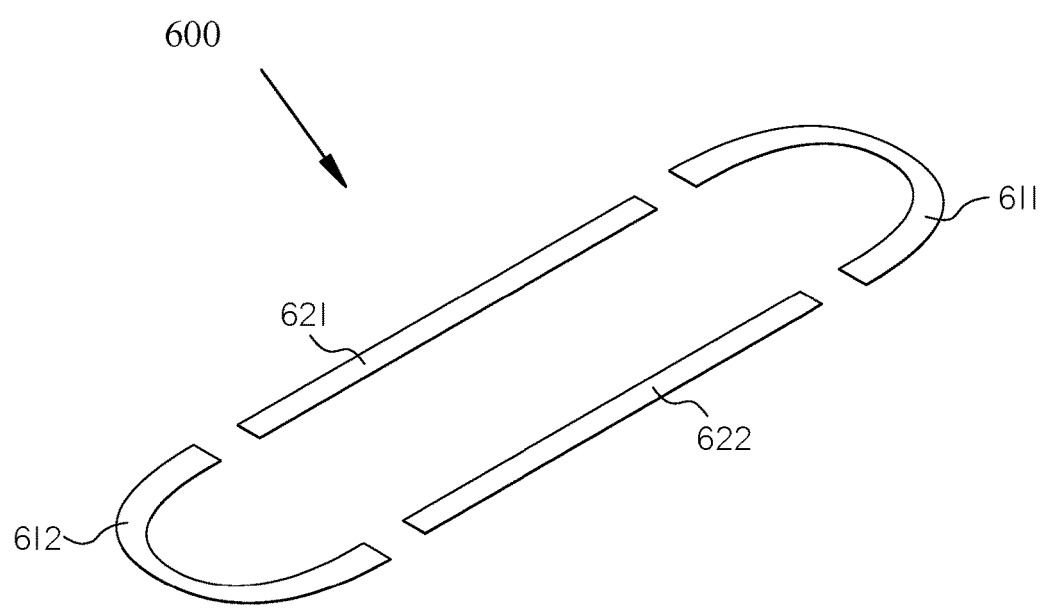
FIG. 8 is an illustration of an exploded view of one embodiment of an outer-core ring layer of a skateboard deck.
Figure 10:
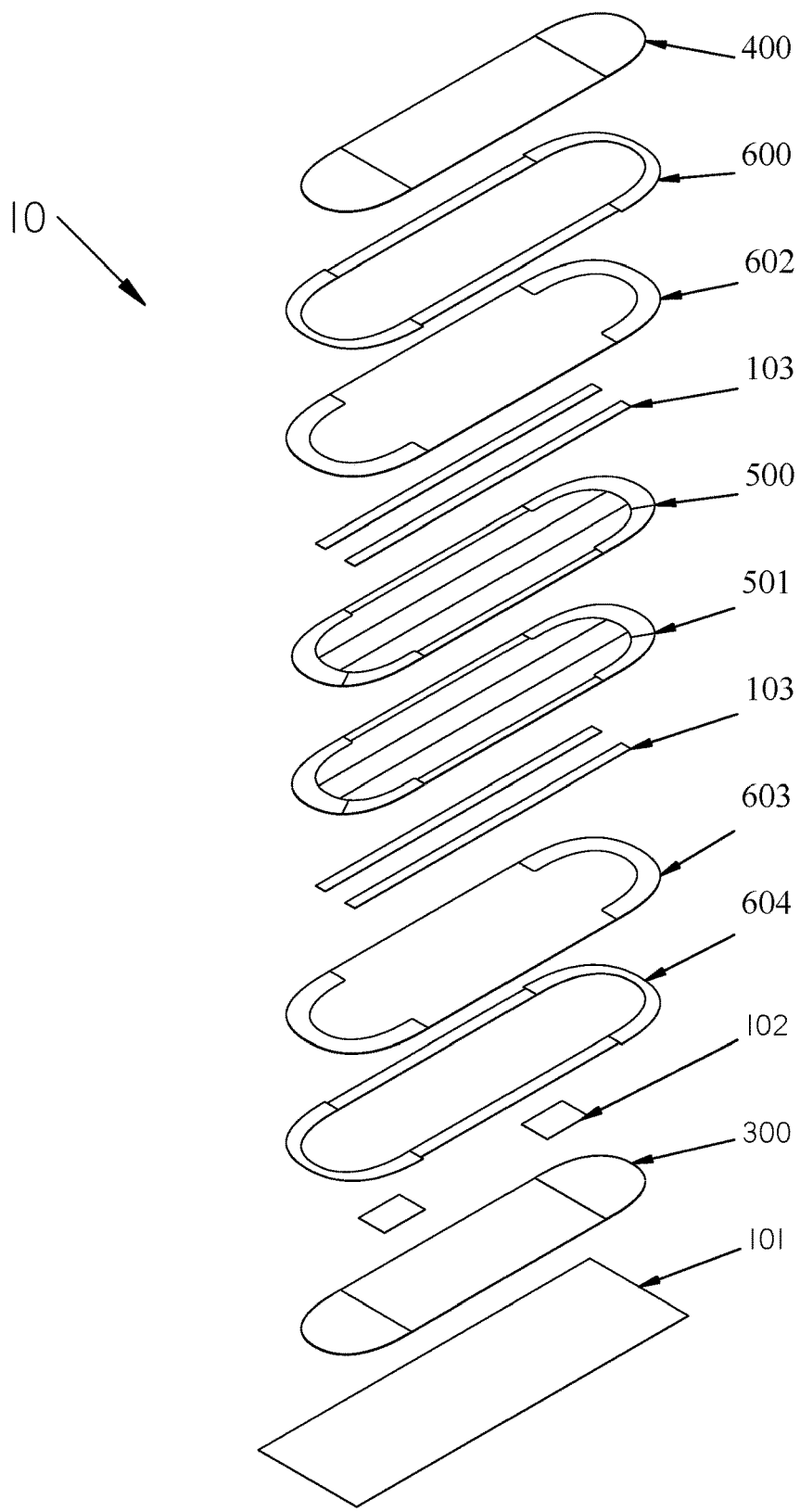
FIG. 10 is an illustration of one embodiment of one method for constructing a skateboard deck.

FIG. 8 is an illustration of an exploded view of one embodiment of an outer-core ring layer of a skateboard deck. As shown, the outer-core ring 600 may comprise one or more protective tipfills 611, 612, and side walls 621, 622, which may be wood or plastic. The outer-core ring 600 may be a single, unitary part, comprising protective tipfills 611, 612 and the side walls 621, 622, so as to form a ring. Alternatively, the outer-core ring 600 may be made up of individual parts comprising protective tipfills 611, 612 and the side walls 621, 622, which themselves may be made up of several different parts. As shown in FIG. 10, the outer-core ring 600 may matingly inlay with a precure bottom 300 or a precure top 400.

Figure 9:
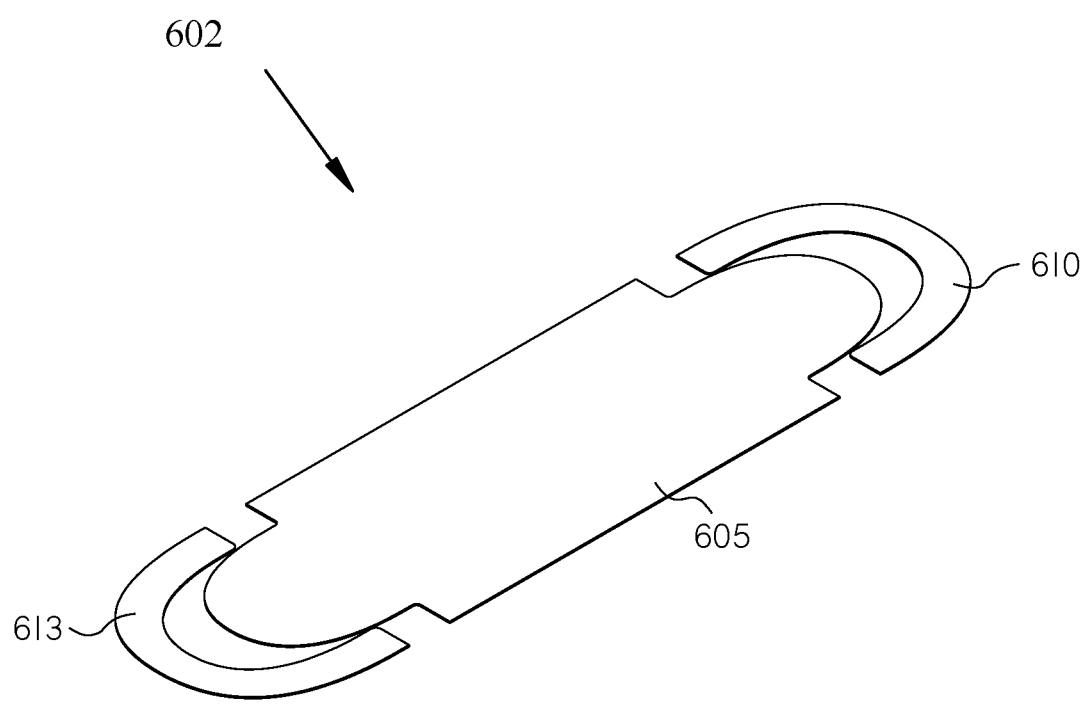
FIG. 9 is an illustration of an exploded view of one embodiment of an outer-core layer of a skateboard deck.

FIG. 9 is an illustration of an exploded view of one embodiment of an outer-core layer of a skateboard deck. FIG. 9 shows that the outer core 602 may comprise an outer-core ply 605, which may be a thin veneer, ply, layer, or sheet of wood, and one or more outer-core tipfills 610, 613. The outer-core tipfills 610, 613 may be placed on the two ends of the outer-core ply 605, such that the outside edges of the outer-core tipfills 610, 613 may sit flush with the outside edges of the outer-core ply 605. The outer-core ring 600 may have the same outer shape and silhouette as the outer-core 602.

The grain direction of the various layers of the skateboard deck may vary, similar to plywood, to increase strength and prevent break points.

FIG. 10 is an illustration of one embodiment of one method for constructing a skateboard deck. FIG. 10 shows that the skateboard deck 10 and method for making the same may comprise providing, stacking, and pressing a precure top 400, one or more outer-core ring 600, one or more outer-core 602, carbon stringers 103, inner-core 500, one or more additional inner-cores 501, carbon stringers 103, one or more additional outer-core 603, one or more additional outer-core rings 604, truck supports 102, precure bottom 300, and a pressing end sheet 101. The layers are adhesively bonded, preferably with an epoxy that thoroughly saturates all layers. The layers may then be pressed together by a mold, shown in FIG. 11, to create the skateboard deck 10. The carbon stringers are composite carbon that run the length of the skate board deck to provide additional strength. The truck supports 102 may be made from fiberglass and provide additional strength to the portion of the skateboard deck 10 that engages with the trucks or wheel brackets of the skateboard.

Figure 11:
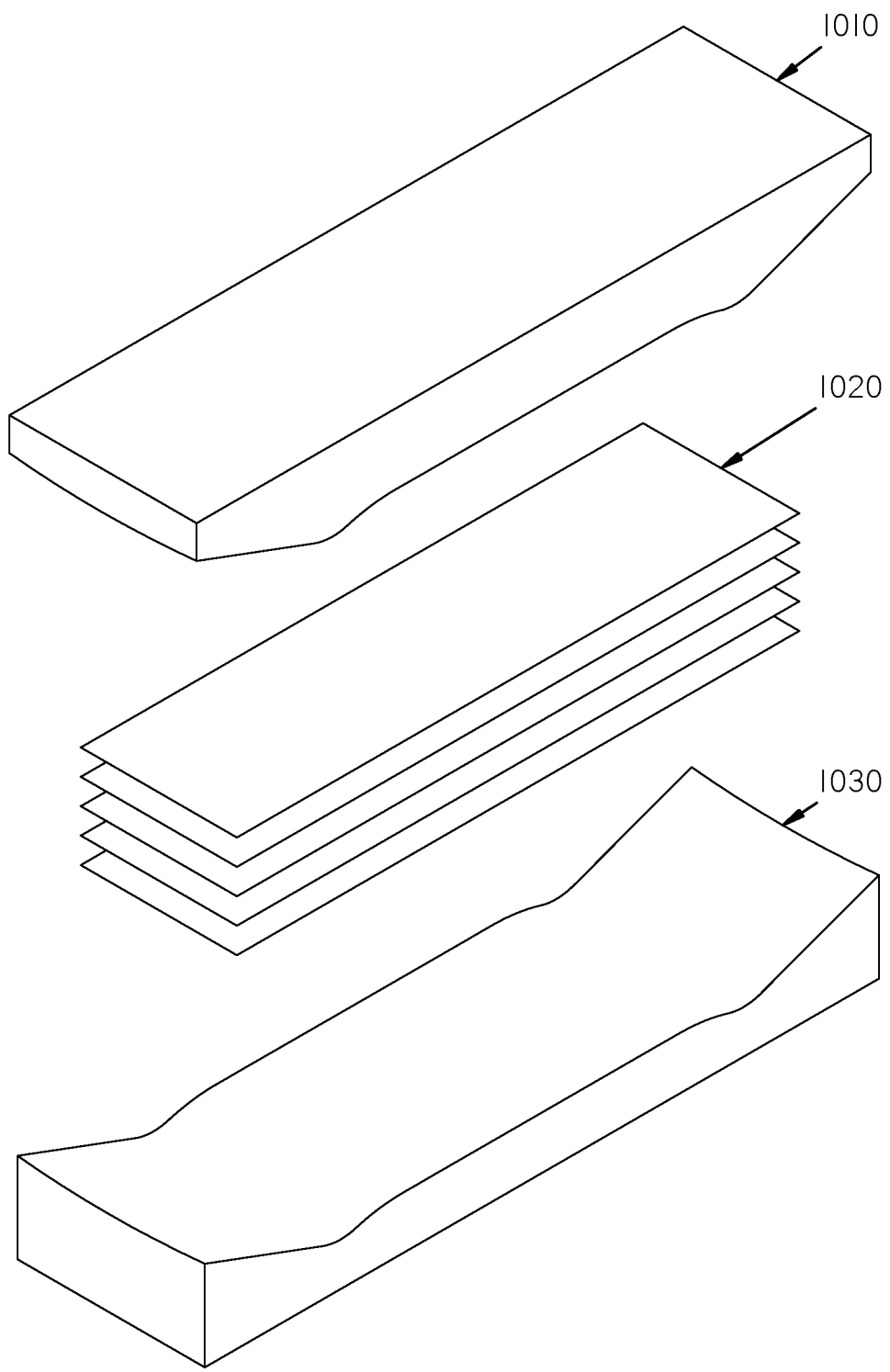
FIG. 11 is an exploded view of an illustration of one embodiment of a skateboard deck with a mold.

FIG. 11 is an exploded view of an illustration of one embodiment of a skateboard deck with a mold. As shown in FIG. 11, any combination, quantity, size, and thickness of the deck layers 1020, which may comprise precure top layers, precure bottom layers, inner-core layers, outer-core rings, outer-core layers, truck supports, carbon stringers, protective tip-fills, protective side edges, veneers, cross-veneers, laminates, top-sheets, or any other core materials have glue, epoxy, or resin applied between the layers, which are aligned and stacked. The stacked layers may then be placed between a top mold 1010 and a bottom mold 1030, and pressed to form the skateboard deck into the desired shape, which may be concave, as shown. The layers are pressed together until the glue or resin cures, creating a skateboard deck. Typically, the longer the press is applied, the stronger the deck is. Once cured, the skateboard deck can be removed from the mold while retaining its concave shape. After pressing and curing, a perimeter cut is done to give the skateboard its final shape, as shown in FIGS. 12a and 12b.

Figure 12A:
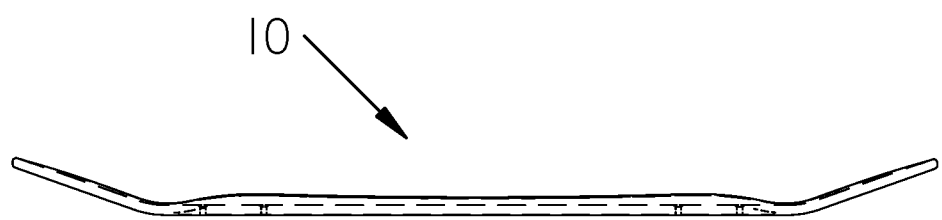
FIGS. 12a and 12b are illustrations of one embodiment of an assembled skateboard deck.
Figure 12B:
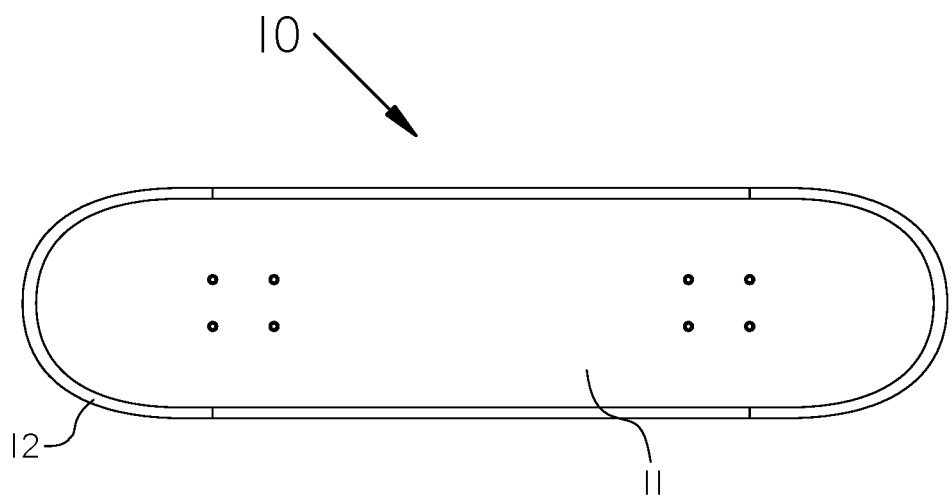

FIGS. 12a and 12b are illustrations of one embodiment of an assembled skateboard deck. FIG. 12a shows a side view of the skateboard deck 10. FIG. 12b is a top view of the skateboard deck 10 with a protective edge 12 around the board 11.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A skateboard deck, comprising:
   a first composite layer;
   at least two wood layers; and
   a second composite layer;
   wherein said first composite layer comprises at least one first composite sheet and at least two first tipfills;
   wherein said second composite layer comprises at least one second composite sheet and at least two second tipfills;
   wherein said at least two wood layers each comprise at least one wood sheet and at least two third tipfills;
   wherein an epoxy is applied to said first composite layer, said at least two wood layers, and said second composite layer;
   wherein said at least two wood layers are stacked between said first composite layer and said second composite layer;
   wherein said first composite layer, said at least two wood layers, and said second composite layer are pressed together in a mold and said epoxy cures to create an uncut skateboard deck;
   wherein said uncut skateboard deck is cut and smoothed.

2. The skateboard deck of claim 1, wherein said at least two first tipfills, said at least two second tipfills, and said at least two third tipfills are plastic.

3. The skateboard deck of claim 1, wherein at least one of said first composite layer, said at least two wood layers, and said second composite layer, comprise at least two protective side edges.

4. The skateboard deck of claim 3, wherein said at least two protective side edges are materials selected from the group of materials consisting of: wood, plastic, and combinations thereof.

5. The skateboard deck of claim 1, wherein said first composite layer, at least one of said at least two wood layers, and said second composite layer, each comprise at least two protective side edges.

6. The skateboard deck of claim 1, wherein said first composite layer, said at least two wood layers, and said second composite layer, each comprise at least two protective side edges.

7. The skateboard deck of claim 1, wherein said first composite sheet and said second composite sheet are materials selected from the group of materials consisting of: fiberglass, carbon fiber, aramid fibers, and combinations thereof.

8. The skateboard deck of claim 1, further comprising a third composite layer;
   wherein said third composite layer consists of a third composite sheet that is saturated with epoxy and layered outside of said first composite layer or said second composite layer.

9. The skateboard deck of claim 8, wherein said third composite sheet is a material selected from the group of materials consisting of: fiberglass, carbon fiber, aramid fibers, and combinations thereof.

10. A skateboard deck, comprising:
    a precure top layer,
    a precure bottom layer,
    at least two inner-core layers, and
    at least two outer-core layers;
    wherein each of said at least two inner-core layers comprise: an inner-core ply; at least two inner-core tipfills, and at least two inner-core side edges;
    wherein said at least two inner-core tipfills matingly inlay with said inner-core ply at opposite ends of said inner-core ply;
    wherein said at least two inner-core side edges matingly inlay with said inner-core ply on opposite sides of said inner-core ply;
    wherein each of said at least two outer-core layers comprise: an outer-core ply, at least two outer-core side edges, and at least four outer-core tipfills;

wherein a first set of two of said at least four outer-core tipfills matingly inlay with said outer-core ply at opposite ends of said outer-core ply;

wherein a second set of two of said at least four outer-core tipfills are stacked above said first set of two of said at least four outer-core tipfills at said opposite ends of said outer-core ply;

wherein said at least two outer-core side edges are stacked above two opposite side edges of said outer-core ply and run between said second set of two of said at least four outer-core tipfills;

wherein said precure top layer comprises at least one top layer composite sheet that is saturated in an epoxy, cured, and cut, such that said precure top layer is configured to matingly inlay within said at least two outer-core side edges and said second set of two of said at least four outer-core tipfills;

wherein said precure bottom layer comprises at least one bottom layer composite sheet that is saturated in said epoxy, cured, and cut, such that said precure bottom layer is configured to matingly inlay within said at least two outer-core side edges and said second set of two of said at least four outer-core tipfills;

wherein resin is applied to all of said layers and said precure top layer is stacked above a first of said at least two outer-core layers, which is stacked above said at least two inner-core layers, which are stacked above a second of said at least two outer-core layers, which is stacked above said precure bottom layer, to form a stack of resin coated layers;

wherein said resin coated layers are pressed together and cured, such that an uncut skateboard deck is created; and wherein said uncut skateboard deck is cut and smoothed.

11. The skateboard deck of claim 10, wherein the precure top layer comprises a fiberglass sheet and a carbon fiber sheet.

12. The skateboard deck of claim 10, wherein the precure bottom layer comprises a fiberglass sheet.

13. The skateboard deck of claim 10, further comprising: at least two truck supports and at least two carbon stringers.

14. The skateboard deck of claim 10, wherein said first set of two of said at least four outer-core tipfills are shaped differently than said second set of said at least four outer-core tipfills.

15. The skateboard deck of claim 10, wherein at least one of said at least two inner-core layers does not comprise two or more inner-core side edges.

16. The skateboard deck of claim 10, wherein said inner-core ply of said at least two inner-core layers is wood; and wherein said outer-core ply of said at least two outer-core layers is wood.

17. The skateboard deck of claim 10, wherein said at least two inner-core tipfills and said at least four outer-core tipfills are plastic.

18. The skateboard deck of claim 10, wherein said at least two inner-core side edges and said at least four outer-core side edges are plastic.

19. A skateboard deck, comprising:
a precure top layer,
a precure bottom layer,
at least two inner-core layers, and
two outer-core layers;

wherein each of said at least two inner-core layers comprise: an inner-core ply; at least two inner-core tipfills, and at least two inner-core side edges;

wherein said at least two inner-core tipfills matingly inlay with said inner-core ply at opposite ends of said inner-core ply;

wherein at least two inner-core side edges matingly inlay with said inner-core ply on opposite sides of said inner-core ply;

wherein each of said two outer-core layers comprise: an outer-core ply, at least two outer-core side edges, and at least four outer-core tipfills;

wherein a first set of two of said at least four outer-core tipfills matingly inlay with said outer-core ply at opposite ends of said outer-core ply;

wherein a second set of two of said at least four outer-core tipfills are stacked above said first set of two of said at least four outer-core tipfills at said opposite ends of said outer-core ply;

wherein said at least two outer-core side edges are stacked above two opposite side edges of said outer-core ply and run between said second set of two of said at least four outer-core tipfills;

wherein said precure top layer comprises a fiberglass sheet and a carbon fiber sheet are saturated in an epoxy, cured, and cut, such that said precure top layer is configured to matingly inlay within said at least two outer-core side edges and said second set of two of said at least four outer-core tipfills;

wherein said precure bottom layer comprises a fiberglass sheet that is saturated in said epoxy, cured, and cut, such that said precure bottom layer is configured to matingly inlay within said at least two outer-core side edges and said second set of two of said at least four outer-core tipfills;

wherein resin is applied to all layers and said precure top layer is stacked above a first of said at least two outer-core layers, which is stacked above said at least two inner-core layers, which are stacked above a second of said at least two outer-core layers, which is stacked above said precure bottom layer, to form a stack of resin coated layers;

wherein said resin coated layers are pressed together and cured, such that an uncut skateboard deck is created;

wherein said uncut skateboard deck is cut and smoothed;

wherein said at least two inner-core tipfills and said at least four outer-core tipfills are plastic;

wherein said inner-core ply of said at least two inner-core layers is wood; and wherein said outer-core ply of said two outer-core layers is wood.

20. The skateboard deck of claim 19, wherein at least one of said at least two inner-core layers does not comprise two or more inner-core side edges.

* * * * *